United States Patent [19]

Mori et al.

[11] Patent Number: 5,234,996

[45] Date of Patent: Aug. 10, 1993

[54] POLYURETHANE ADHESIVE

[75] Inventors: Masahito Mori; Kousuke Torii, both of Takatsuki; Hirokazu Okamoto, Shijonawate, all of Japan

[73] Assignee: Sunstar Giken Kabushiki Kaisha, Osaka, Japan

[21] Appl. No.: 667,641

[22] Filed: Mar. 11, 1991

[51] Int. Cl.$^5$ .............................. C08F 8/30; C08G 18/10
[52] U.S. Cl. .............................. 525/123; 525/453; 525/454; 525/455; 525/457; 525/458; 528/59; 528/60; 528/64; 528/66; 528/75
[58] Field of Search ............... 528/44, 60, 64, 66, 528/59, 75, 272; 525/123, 453, 454, 455, 457, 458

[56] References Cited

U.S. PATENT DOCUMENTS

| | | | |
|---|---|---|---|
| 4,551,517 | 11/1985 | Herold et al. | 528/60 |
| 4,728,684 | 3/1988 | Kadowaki et al. | 524/271 |
| 4,994,540 | 2/1991 | Boerner et al. | 528/44 |
| 5,041,517 | 8/1991 | Vu et al. | 528/60 |
| 5,115,007 | 5/1992 | Chihara et al. | 524/267 |

FOREIGN PATENT DOCUMENTS 0267053  5/1988  European Pat. Off. .
0293602  7/1988  European Pat. Off. .

*Primary Examiner*—John Kight, III
*Assistant Examiner*—John M. Cooney, Jr.
*Attorney, Agent, or Firm*—Wegner, Cantor, Mueller & Player

[57] ABSTRACT

A two-part polyurethane adhesive which comprises a main component comprising a hydroxyl-terminated saturated polyester resin or a polyester urethane rubber prepared by reacting said hydroxyl-terminated saturated polyester resin with a diisocyanate compound, and a curing agent comprising a urethane prepolymer having an active isocyanate group which is prepared by reacting a hydrogenated hydroxyl-terminated polybutadiene with an excess amount of a polyisocyanate. Said polyurethane adhesive is useful for adhering a polyolefin base material and a covering material for the production of automobile interior parts.

6 Claims, No Drawings

POLYURETHANE ADHESIVE

TECHNICAL FIELD

This invention relates to a polyurethane adhesive, more particularly a two-part polyurethane adhesive useful for adhering a polyolefin base material and a covering (skin) material for the production of automobile interior parts, which comprises a main component comprising a specific polyester resin or polyester urethane rubber and a curing agent comprising a polybutadiene-type urethane prepolymer derived from hydrogenated hydroxyl-terminated polybutadiene, said adhesive having excellent initial adhesion at atmospheric temperature.

PRIOR ART

In view of the recent tendency of desiring high-class cars, the automobile interior parts are in the direction of increasing of being covered by a covering (skin) material such as cushion material (e.g. a sheet, film or foam of polyvinyl chloride (PVC) or polyurethane), fabrics, etc. The covering is usually carried out by adhering the base material with a covering (skin) material in view of design limitation. A known adhesive for such a purpose is a two-part polyurethane adhesive which comprises a main component comprising a solution of a polyester urethane rubber in a solvent and a curing agent, said polyester urethane being prepared by reacting a hydroxyl-terminated saturated polyester resin with a diisocyanate compound (cf. U.S. Pat. No. 4,728,684). This adhesive is advantageous in good workability because it is effective only by applying to a single face of the substances to be adhered and is re-activated by heat and is further advantageous in the excellent heat resistance and low cost.

By the way, it has been studied to use a polyolefin material or a composite material of polyolefin for the base material or covering material in view of the low cost and also excellent moldability thereof. For adhering such polyolefin base material or covering material, the above known polyurethane adhesive can not practically be used because of less adhesion (less initial adhesion, less adhesion under atmospheric conditions and/or under heating to the polyolefin materials.

OBJECTS OF THE INVENTION

Under the circumstance, the present inventors have intensively studied on improvement of the polyurethane adhesive so as to make it fit to adhesion of the polyolefin materials. The inventors have found that when a hydrogenated hydroxyl-terminated polybutadiene is added to the main component of the above polyurethane adhesive, the adhesive has improved adhesion under atmospheric conditions and/or under heating, but it has still less initial adhesion and further less storage stability because of less compatibility of the above additive to the main component. According to the further intensive study of the inventors, it has been found that when a prepolymer prepared by reacting the hydrogenated hydroxyl-terminated polybutadiene with a polyisocyanate compound is used as a curing agent together with the main component comprising a polyester urethane rubber, the polyurethane adhesive can show excellent adhesion to the polyolefin materials, particularly excellent initial adhesion at atmospheric temperature, with keeping the excellent properties of the known polyurethane adhesive without deteriorating the storage stability, and further that a saturated polyester resin in addition to polyester urethane rubber can also be used as the main component.

An object of the invention is to provide an improved two-part polyurethane adhesive useful for adhering polyolefin materials. Another object of the invention is to provide a two-part polyurethane adhesive comprising a main agent comprising a specific polyester resin or polyester urethane rubber and a curing agent comprising a urethane prepolymer having an active isocyanate group. A further object of the invention is to provide an adhesive suitable for adhering a polyolefin base material with a covering (skin) material under atmospheric conditions. These and other objects and advantages of the invention will be apparent to those skilled in the art from the following description.

DETAILED DESCRIPTION OF THE INVENTION

The two-part polyurethane adhesive of this invention comprises a main component comprising a solution of a hydroxyl-terminated saturated polyester resin or a polyester urethane rubber prepared by reacting said polyester resin with a diisocyanate compound and a curing agent comprising a urethane prepolymer having an active isocyanate group which is prepared by a hydrogenated hydroxyl-terminated polybutadiene with a diisocyanate compound (said polyurethane prepolymer having an active isocyanate group being, hereinafter, referred to as "NCO urethane prepolymer").

The hydroxyl-terminated saturated polyester resin used for the main component in this inventon is prepared by the condensation reaction of a polybasic acid (e.g. terephthalic acid, isophthalic acid, phthalic acid, succinic acid, adipic acid, dimerized linoleic acid, maleic acid, azelaic acid, sebacic acid, etc.) and a polyhydroxyl compound (e.g. ethylene glycol, 1,4-butanediol, 1,5-pentanediol, 1,6-hexanediol, diethylene glycol, triethylene glycol, polyethylene glycol, propylene glycol, trimethylolpropane, hexanetriol, glycerin, trimethylolethane, pentaerythritol, etc.). The hydroxyl-terminated saturated polyester resin has a weight average molecular weight of 500 to 30,000.

The polyester urethane rubber used instead of the above saturated polyester resin is an elastomer having a urethane bond in the molecule, that is, a high crystalline linear polymer having hydroxyl groups at both termini and having a weight average molecular weight of 10,000 to 500,000, preferably 50,000 to 200,000, which is solid under atmospheric conditions. Said polyester urethane rubber is prepared by reacting the above saturated polyester resin with a diisocyanate-compound (e.g. tolylene diisocyanate, diphenylmethane diisocyanate, hexamethylene diisocyanate, xylylene diisocyanate, cyclohexylmethane diisocyanate, etc.), wherein a part of the active hydrogen atoms in the terminal hydroxyl groups is reacted with said diisocyante compound.

The main component saturated polyester resin or polyester urethane rubber is used in a solution in an appropriate organic solvent, such as esters (e.g. ethyl acetate, butyl acetate, etc.), ketones (e.g. methyl ethyl ketone, cyclohexanone, acetone, etc.), aromatic hydrocarbons (e.g. toluene, xylene, benzene, etc.), chlorinated hydrocarbons (e.g. methylene chloride, etc.), and the like, said solution being usually in a concentration of 1 to 30% by weight. The main component may optionally include other additives such as chlorinated rubber (resin), adhesion promoter (e.g. rosin resin or rosin derivative, petroleum resin, terpene resin, etc.), polyol compounds (e.g. polyalkylene ether polyol, etc.), and the like.

The NCO urethane prepolymer used as the curing agent in this invention is prepared by reacting a hydrogenated hydroxyl-terminated polybutadiene and a polyisocyanate compound wherein the polyisocyanate compound is used in such an amount that the active isocyanate group (NCO) in the polyisocyanate compound becomes excess to the hydroxyl group (OH) in the hydrogenated hydroxyl-terminated polybutadiene. The reaction is optionally carried out in a reaction solvent (e.g. hexane, toluene, heptane, cyclohexane, xylene, methylene chloride, etc.) at room temperature or an elevated temperature of from 40° to 100° C. The reaction is also controlled so that the obtained prepolymer has an NCO content of 0.5 to 30% by weight, preferably 5 to 20% by weight. The reaction may also optionally be carried out in the presence of a catalyst such as dibutyl tin dilaurate, triethylamine, lead octoate, and the like. The reaction mixture thus obtained can be used as a curing agent as it stands.

The hydrogenated hydroxyl-terminated polybutadiene to be used for the preparation of the NCO urethane prepolymer is a product obtained by hydrogenating a polybutadiene, wherein the polybutadiene structure is 1,2-vinyl structure or 1,4-trans structure alone, or a mixed structure of 1,2-vinyl structure and 1,4-trans structure, or of 1,2-vinyl structure, 1,4-trans structure and 1,4-cis structure, or of 1,4-trans structure and 1,4-cis structure, any of which can be used.

The polyisocyanate compound includes, for example, aliphatic polyisocyanates [e.g. 1.6-hexamethylene diisocyanate (HDI), 2,2,4-trimethylhexamethylene diisocyanate, lysine methyl ester diisocyanate, etc.], alicyclic polyisocyanates [e.g. hydrogenated diphenylmethane diisocyanate, isophorone diisocyanate, hydrogenated tolylene diisocyanate, etc.], aromatic polyisocyanates [e.g. tolylene diisocyanate (TDI), diphenylmethane-4,4'-diisocyanate (MDI), naphthylene diisocyanate, xylylene diisocyanate, triphenylmethane triisocyanate, tris(4-phenylisocyanate) thiophosphate, etc.], and the like, which may be used alone or in combination of two or more thereof.

The NCO urethane prepolymer curing agent as prepared above has a polar group attached to the molecular chain of the hydrogenated hydroxyl-terminated polybutadiene and hence has good compatibility with the polyester resin or polyester urethane rubber of the main component.

The polyurethane adhesive of this invention comprises the above-mentioned main component having terminal hydroxyl group and the curing agent having terminal NCO group, which are contained in a ratio of NCO/OH of 1 to 20, preferably 2 to 10. When this ratio is less than 1, the curing agent can not exhibit the desired curing effect, and on the other hand, when the ratio is over 20, the adhesive tends to show less adhesion. The adhesive may optionally be incorporated with other additives such as a reaction promoting catalyst (e.g. dibutyl tin dilaurate, triethylamine, lead octoate, etc.), a tackifier (e.g. rosin resin, petroleum resin, terpene resin, or derivatives of these resins), an antioxidant (e.g. phenols such as 2,6-di-t-butyl-4-methylphenol, etc.), and the like.

The adhesive comprising the above components of this invention is particularly useful for the lamination and adhesion process of a base material of a polyolefin material [e.g. polypropyene (PP), ethylene-propylenediene terpolymer (EPDM), modified polypropylene, modified polyethylene (PE), etc.] with a covering material, for example, a sheet, film or foam of polyvinyl chloride (PVC) or polyurethane, which can be done with excellent initial adhesion. The adhesive of this invention can also be used for other purposes, such as adhesion of other plastic materials, wooden materials, metallic materials, and the like.

The invention is illustrated by the following Examples and Reference Examples but should not be construed to be limited thereto.

EXAMPLES 1 to 6 and REFERENCE EXAMPLES 1 to 3

(1) Main components

A polyester urethane rubber (Desmocoll #400, manufactured by Bayer) (100 parts by weight) is dissolved in methyl ethyl ketone (570 parts by weight) to prepare a main component solution [No. 1]. In the same manner as above except that as the polyester urethane rubber, Pandex T-5205 (manufactured by Dainippon Ink and Chemicals, Inc.) is used instead of Desmocoll #400, there is prepared a main component solution [No. 2].

(2) Curing agents

A hydrogenated hydroxyl-terminated polybutadiene (Polytail H, manufactured by Mitsubishi Kasei Corporation) and diphenylmethane-4, 4'-diisocyanate (MDI) or 1,6-hexamethylene diisocyanate (HDI) are reacted in the amounts as shown in the following Table 1 in toluene, optionally in the presence of a reaction catalyst (i.e. dibutyl tin dilaurate), at 80° C. for 8 hours to give curing agent solutions [Nos. 1 to 4].

TABLE 1

|  | No. 1 | No. 2 | No. 3 | No. 4 |
|---|---|---|---|---|
| Polytail H | 100 | 100 | 100 | 100 |
| MDI | 20 | 40 | — | — |
| HDI | — | — | 15 | 30 |
| Toluene | 1080 | 1260 | 1035 | 1170 |
| Reaction catalyst | — | — | 0.1 | 0.1 |

(3) Polyurethane adhesives

Each components as shown in the following Table 2 are used in the amounts as shown therein to prepare polyurethane adhesives (the components are mixed just before used).

(4) Adhesive tests

The polyurethane adhesive was applied to a polypropylene (PP) panel (IP407, manufactured by Mitsui Petrochemical Industries, Ltd.) (width 30 cm, length 100 mm) by air-spray in an amount of 150 g/m$^2$, and the panel was dried at 80° C. for 2 minutes. A sheet of a foamed polyvinyl chloride (PVC) (Olsia MP-866, manufactured by Sunstar Engineering Inc.) (width 25 mm, length 150 mm), which was heated previously at 140° C. for 4 minutes, was put on the adhesive-applied face of the above PP panel, and the laminated product was pressed under a pressure of 0.5 kg/cm$^2$ for 10 seconds. The resultant laminated product was subjected to the tests for initial peeling strength, peeling strength under atmospheric conditions and heat creep resistance as follows:

Peeling strength: The laminated sheet was pulled at a rate of 200 mm/minute and at an angle of 180° and the strength for peeling the sheet (kg/25 mm) was measured.

Initial peeling strength: It was measured 10 minutes after laminating the panel and sheet and pressing thereof.

Peeling strength under atmospheric conditions: It was measured after the laminated product was kept at 20° C. for 24 hours.

Heat creep resistance: After the laminated product was kept for 20° C. for 24 hours, a load of 100 g/25 mm was given at the end of the laminated sheet at an angle of 90° for 24 hours, and thereafter, the length of peeling of the sheet from the panel was measured.

The results are shown in the following Table 2.

TABLE 2

|  | Example No. |  |  |  |  |  | Ref. Example No. |  |  |
|---|---|---|---|---|---|---|---|---|---|
|  | 1 | 2 | 3 | 4 | 5 | 6 | 1 | 2 | 3 |
| Main comp. soln. No. 1 | 100 | 100 | 100 | 100 | — | — | 100 | 100 | — |
| Main comp. soln. No. 2 | — | — | — | — | 100 | 100 | — | — | 100 |
| Curing agent soln. No. 1 | 5 | — | — | — | 5 | — | — | — | — |
| Curing agent soln. No. 2 | — | 5 | — | — | — | — | — | — | — |
| Curing agent soln. No. 3 | — | — | 5 | — | — | 5 | — | — | — |
| Curing agent soln. No. 4 | — | — | — | 5 | — | — | — | — | — |
| Desmodur R* | — | — | — | — | — | — | 5 | 5 | 5 |
| 10% solution of Polytale H in toluene | — | — | — | — | — | — | — | 5 | — |
| Initial peeling strength (kg/25 mm) | 1.5 | 1.5 | 1.5 | 1.5 | 1.7 | 1.7 | 0.2 | 0.2 | 0.2 |
| Peeling strength under atm. conditions (kg/25 mm) | 3.5 | 3.5 | 3.5 | 3.5 | 3.5 | 3.5 | 0.2 | 3.5 | 0.2 |
| Heat creep resistance (mm) | 0 | 0 | 0 | 0 | 0 | 0 | >50 | 0 | >50 |

*A 20% solution of triphenylmethane triisocyanate in toluene (manufactured by Bayer)

What is claimed is:

1. A two-part polyurethane adhesive which consists essentially of
   (A) a main component consisting of a hydroxyl-terminated saturated polyester resin which is prepared by a condensation reaction of a polybasic acid and a polyhydroxyl compound or a polyester urethane rubber which is prepared by reacting the hydroxyl-terminated saturated polyester resin with a diisocyanate compound, which is in the form of a solution in an organic solvent, and
   (B) a curing agent consisting essentially of a urethane prepolymer having an active isocyanate group which is prepared by reacting a hydrogenated hydroxyl-terminated polybutadiene with an excess amount of a polyisocyanate.

2. The adhesive according to claim 1, wherein the hydroxyl-terminated saturated polyester resin has a weight average molecular weight of 500 to 30,000.

3. The adhesive according to claim 1, wherein the polyester urethane rubber has a weight average molecular weight of 10,000 to 500,000.

4. The adhesive according to claim 1, wherein the main component is a solution containing 1 to 30 % by weight of the hydroxyl-terminated saturated polyester resin or polyester urethane rubber.

5. The adhesive according to claim 1, wherein the urethane prepolymer having an active isocyanate group has an NCO content of 0.5 to 30% by weight.

6. The adhesive according to claim 1, wherein the hydroxyl-terminated saturated polyester resin or polyester urethane rubber as the main component and the urethane prepolymer having an active isocyanate group as the curing agent are incorporated in a ratio of NCO-/OH of 1 to 20.

* * * * *